(12) United States Patent
Takahashi et al.

(10) Patent No.: US 9,540,034 B2
(45) Date of Patent: Jan. 10, 2017

(54) STEERING APPARATUS

(71) Applicant: YAMADA MANUFACTURING CO., LTD., Kiryu-shi, Gunma (JP)

(72) Inventors: Ryosuke Takahashi, Kiryu (JP); Katsutoshi Tsuji, Kiryu (JP); Norihiko Yokota, Kiryu (JP); Toru Ito, Kiryu (JP); Noriyuki Watanabe, Kiryu (JP)

(73) Assignee: YAMADA MANUFACTURING CO., LTD., Kiryu-Shi (JP)

( * ) Notice: Subject to any disclaimer, the term of this patent is extended or adjusted under 35 U.S.C. 154(b) by 0 days.

(21) Appl. No.: 15/070,190

(22) Filed: Mar. 15, 2016

(65) Prior Publication Data

US 2016/0272235 A1    Sep. 22, 2016

(30) Foreign Application Priority Data

Mar. 19, 2015  (JP) ................. 2015-056160

(51) Int. Cl.
*B62D 1/19*    (2006.01)
*B62D 1/184*    (2006.01)

(52) U.S. Cl.
CPC .............. *B62D 1/195* (2013.01); *B62D 1/184* (2013.01)

(58) Field of Classification Search
CPC ................................ B62D 1/195; B62D 1/184
See application file for complete search history.

(56) References Cited

U.S. PATENT DOCUMENTS

| | | | | |
|---|---|---|---|---|
| 4,838,576 A * | 6/1989 | Hamasaki | ............. | B62D 1/195 188/372 |
| 4,901,592 A * | 2/1990 | Ito | ............ | B62D 1/195 188/371 |
| 5,209,135 A * | 5/1993 | Ichikawa | ............... | B62D 1/181 188/371 |
| 5,511,823 A * | 4/1996 | Yamaguchi | ............ | B62D 1/195 188/371 |
| 5,547,221 A * | 8/1996 | Tomaru | ................. | B62D 1/195 280/777 |
| 6,170,873 B1 * | 1/2001 | Jurik | ...................... | B62D 1/195 188/371 |
| 6,814,373 B2 * | 11/2004 | Munro | ................... | B62D 1/195 188/371 |

(Continued)

FOREIGN PATENT DOCUMENTS

JP    2012-040949    3/2012

*Primary Examiner* — Paul N Dickson
*Assistant Examiner* — Joselynn Y Sliteris
(74) *Attorney, Agent, or Firm* — Rankin, Hill & Clark LLP

(57) ABSTRACT

A steering apparatus includes: an outer column and an inner pipe retained by the outer column for movement in a front-rear direction of a vehicle, an inner-pipe retaining section with opposed leg sections interconnected via a fastening mechanism. The apparatus further includes an impact energy absorbing member provided on the inner pipe and having a generally U sectional shape along the axis line of the inner pipe. The absorbing member includes: a base section mounted to the inner pipe; an abuttable section bent from the rear end of the base section such that it is abuttable against the fastening mechanism; and an energy absorbing section bent forward from one end of the abuttable section such that, when an impact is input to the inner pipe, the absorbing section absorbs energy of the impact while deforming by abutting against the fastening mechanism.

3 Claims, 8 Drawing Sheets

(56) References Cited

U.S. PATENT DOCUMENTS

| | | | |
|---|---|---|---|
| 7,118,131 B2* | 10/2006 | Manwaring | B62D 1/192 188/374 |
| 7,125,047 B2* | 10/2006 | Lee | B62D 1/195 280/775 |
| 7,455,320 B2* | 11/2008 | Imamura | B62D 1/195 280/777 |
| 7,490,855 B2* | 2/2009 | Inayoshi | B62D 1/192 280/777 |

* cited by examiner

STEERING APPARATUS

FIELD OF THE INVENTION

The present invention relates to steering apparatus for a vehicle which are equipped with a telescopic positional position adjustment mechanism and a secondary-collision-impact absorption mechanism and which is capable of implementing these two mechanisms by a single member.

BACKGROUND OF THE INVENTION

Steering apparatus of a type where a steering wheel operable by a human driver is adjustable in position in a front-rear direction of a vehicle are commonly known. In one example of such steering apparatus, an outer column is supported by a bracket, and a cylindrical inner pipe is retained by the outer column for movement in the front-rear direction of the vehicle (i.e., in such a manner that it is movable in the front-rear direction of the vehicle), as disclosed in Japanese Patent Application Laid-Open Publication No. 2012-40949.

FIG. 8 hereof shows the steering apparatus 100 disclosed in the above-mentioned No. 2012-40949 publication. As shown in FIG. 8(a), the steering apparatus 100 includes; the outer column 103 supported by the bracket 101 and having a bolt 102 passed therethrough; the inner pipe 104 retained by the outer column 103 for movement in the front-rear direction (left-right direction in the figure); and an impact energy absorbing member 110 mounted on the upper surface of the inner pipe 104 for absorbing impact energy when an impact has been input from the steering wheel.

The impact energy absorbing member 110, which is formed by bending a metal plate, includes: a base section 111 fixed to the upper surface of the inner pipe 104; an upward projecting section 112 extending upward from the rear end of the base section 111; an upper plate section 113 extending rearward from the upper end of the upward projecting section 112; an abuttable section 114 projecting downward from the rear end of the upper plate section 113 and abuttable against the bolt 102; an energy absorbing section 115 extending forward from the lower end of the abuttable section 114 and constructed in such a manner that, when an impact has been input to the inner pipe 104, it absorbs impact energy while deforming by abutting against the inner pipe 104; and a front stopper 116 projecting upward from the front end of the energy absorbing section 115 for restricting rearward movement of the inner pipe 104.

Referring to FIG. 8(a) and FIG. 8(b) as well, the bracket 101, the bolt 102 and the outer column 103 are immovably fixed, while the inner pipe 104 and the impact energy absorbing member 110 are movable in the front-rear direction. By sliding the inner pipe 104 in the front-rear direction, the human driver can adjust the steering wheel to a desired position. Retaining force imparted by the outer column 103 to the inner pipe 104 can be increased as fastening force by the bolt 102 is increased. By the increased retaining force, the movement of the inner pipe 104 in the front-rear direction can be restricted.

The abuttable section 114 can be said to be a rear stopper for restricting forward movement of the inner pipe 104 in normal operating conditions. FIG. 8(b) shows the inner pipe 104 and the impact energy absorbing member 110 having moved to their respective forward movement limit positions.

If an impact load has been input from the rear to the steering apparatus 100 in the state shown in FIG. 8(a) and if the input impact load is large, the inner pipe 104 moves forward against the fastening force of the bolt 102, so that the abuttable section 114 abuts against bolt 102 as shown in FIG. 8(b). If the impact load is further input in this state, the inner pipe 104 further moves forward and thus the energy absorbing section 115 absorbs energy of the impact (impact energy) while deforming by abutting against the bolt 102, as shown in FIG. 8(c).

In such a steering apparatus 100 equipped with impact energy absorbing performance or function, it is desirable that constant impact absorbing characteristics be achieved stably. In other words, it is desirable that constant impact absorbing characteristics be achievable stably per product (per steering apparatus).

However, the manner in which the energy absorbing section 115 abuts against the inner pipe 104 would vary per product. In the steering apparatus 100, the energy absorbing section 115 moves while contacting the upper surface of the inner pipe 104. Thus, it is supposed that impact energy absorbing characteristics of the energy absorbing section 115 are influenced by friction between the inner pipe 104 and the energy absorbing section 115. Due to the variation in the manner in which the energy absorbing section 115 abuts against the inner pipe 104, the impact energy absorbing characteristics would differ per different product.

SUMMARY OF THE INVENTION

In view of the foregoing prior art problems, it is an object of the present invention to provide an improved steering apparatus which can stably achieve constant impact energy absorbing characteristics. It is another object of the present invention to provide an improved technique which allows constant impact energy absorbing characteristics to be achieved stably per product.

In order to achieve the above-mentioned object, the present invention provides an improved steering apparatus for a vehicle including an outer column supported by a bracket, and an inner pipe retained by the outer column for movement in a front-rear direction of a vehicle, the outer column including a pipe retaining section retaining the outer periphery of the inner pipe, and a pair of opposed leg sections extending from opposite end portions of the pipe retaining section and interconnected via a fastening mechanism, the movement, in the front-rear direction, of the inner pipe being restricted by fastening force of the fastening mechanism, which comprises a metal-made impact energy absorbing member provided on the inner pipe and having a generally U shape as viewed in section along an axis line of the inner pipe, the impact energy absorbing member including: a base section mounted to the inner pipe; an abuttable section bent from the rear end of the base section in such a manner that the abuttable section is abuttable against the fastening mechanism; and an energy absorbing section bent back forward from an end of the abuttable section in such a manner that, when an impact is input or applied to the inner pipe, the energy absorbing section absorbs energy of the impact while deforming by abutting against the fastening mechanism.

According to the present invention, the impact energy absorbing member, having a generally U sectional shape, includes: the base section mounted to the inner pipe; the abuttable section bent from the rear end of the base section and abuttable against the fastening mechanism; and the energy absorbing section bent back forward from an end of the abuttable section. In the present invention, the energy absorbing section does not contact the inner pipe. Thus, the present invention can reduce a total area of portions of the energy absorbing section that can contact other component parts when the energy absorbing section deforms and thereby minimize influences of friction and stabilize impact-energy-absorbing characteristics per product. In addition, the present invention permits designing of the steering apparatus with no consideration of friction with the input pipe and hence advantageously facilitates the designing of the steering apparatus.

Preferably, in the steering apparatus of the invention, the fastening mechanism includes: a bolt passed through the pair of opposed leg sections; a nut screwed to the bolt; and a guide member mounted on a shaft section of the bolt and located between the pair of opposed leg sections, and the guide member includes: guide member leg portions extending along opposite sides of the energy absorbing section; and a guide member bottom portion extending along the energy absorbing section in such a manner as to interconnect respective ends of the guide member leg portions. Thus, as the energy absorbing section moves (or is displaced) in a direction perpendicular to the axis of the bolt during deformation of the energy absorbing section, it contacts the guide member bottom portion. By the contact, with the guide member bottom portion, of the energy absorbing section, the displacement of the energy absorbing section in the direction perpendicular to the axis of the bolt can be restricted, so that impact energy can be reliably absorbed by the energy absorbing section.

Further, preferably, in the steering apparatus of the invention, the impact energy absorbing member includes: flange sections extending from respective ones of a pair of side portions of the base section along opposite sides of the guide member; and extension sections extending from the rear ends of respective ones of the flange sections rearward beyond the abuttable section. Thus, as the energy absorbing section moves (or is displaced) along the axis of the bolt (in an axial direction of the bolt) during deformation of the energy absorbing section, it contacts one of the extension sections. By the contact, with the extension section, of the energy absorbing section, the displacement of the energy absorbing section along the axis of the bolt can be restricted, so that impact energy can be reliably absorbed by the energy absorbing section.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

Certain preferred embodiments of the present invention will hereinafter be described in detail, by way of example only, with reference to the accompanying drawings, in which.

DETAILED DESCRIPTION OF THE INVENTION

In the following description, the terms "front", "rear", "left", "right", "up", "down", etc. are used to refer to directions as seen from a human driver (vehicle occupant) of a vehicle.

Figure 1:
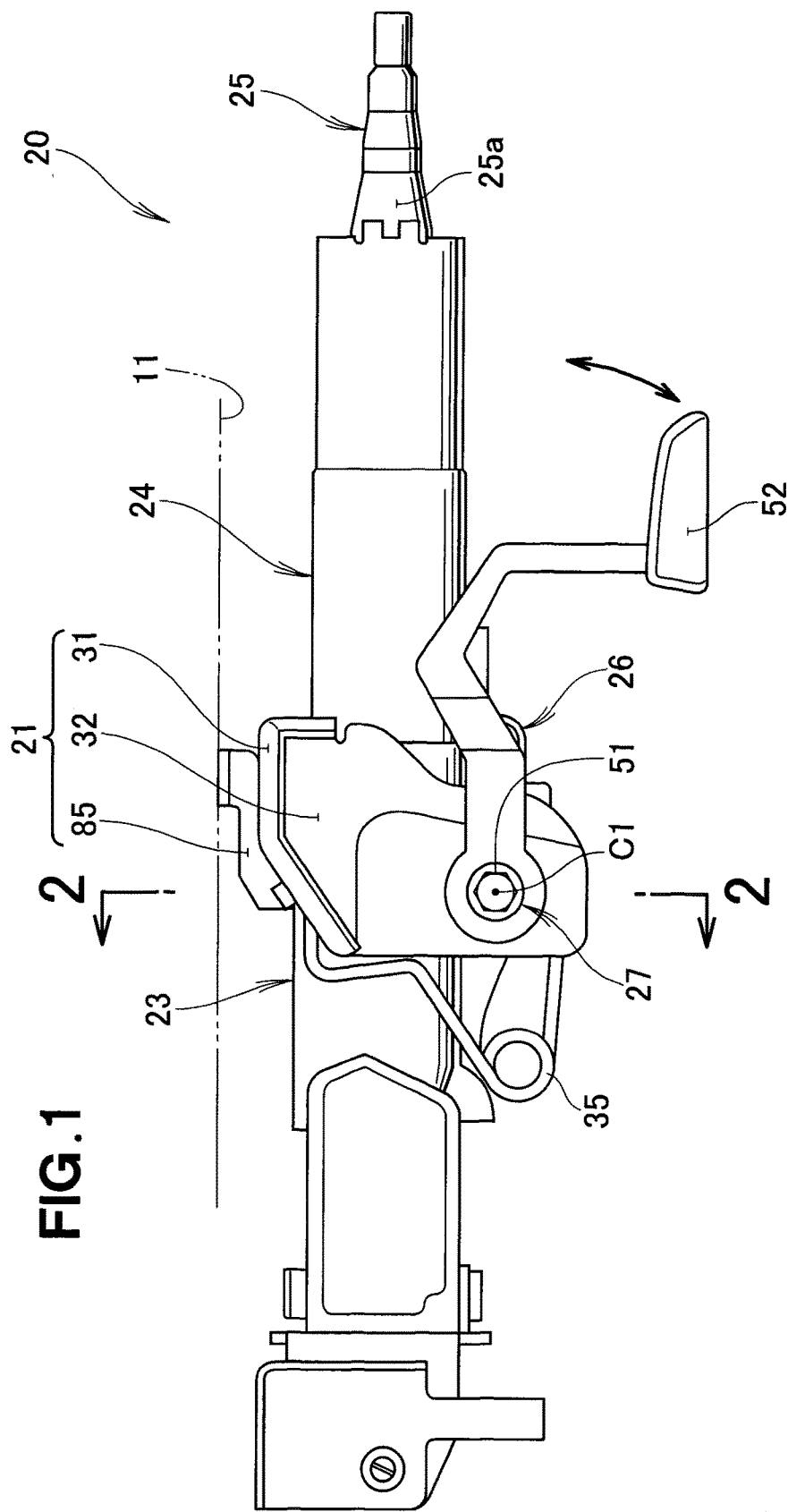
FIG. 1 is a side view illustrating a steering apparatus according to an embodiment of the present invention.

Reference is now made to FIG. 1 which shows in side elevation a steering apparatus 20 according to an embodiment of the present invention. As shown, the steering apparatus 20 includes: a bracket 21 fixed to a vehicle body 11; an outer column 23 supported by the bracket 21; an inner pipe 24 retained by the outer column 23 for movement in a vehicle front-rear direction; a steering shaft 25 disposed inside the inner pipe 24 and having a steering wheel mounted on its rear end; an impact energy absorbing member 26 mounted to a lower portion of the inner pipe 24 for absorbing energy of a load input from the rear end of the steering shaft 25; and a fastening mechanism 27 for restricting movement, in the front-rear direction, of the inner pipe 24.

Figure 2:
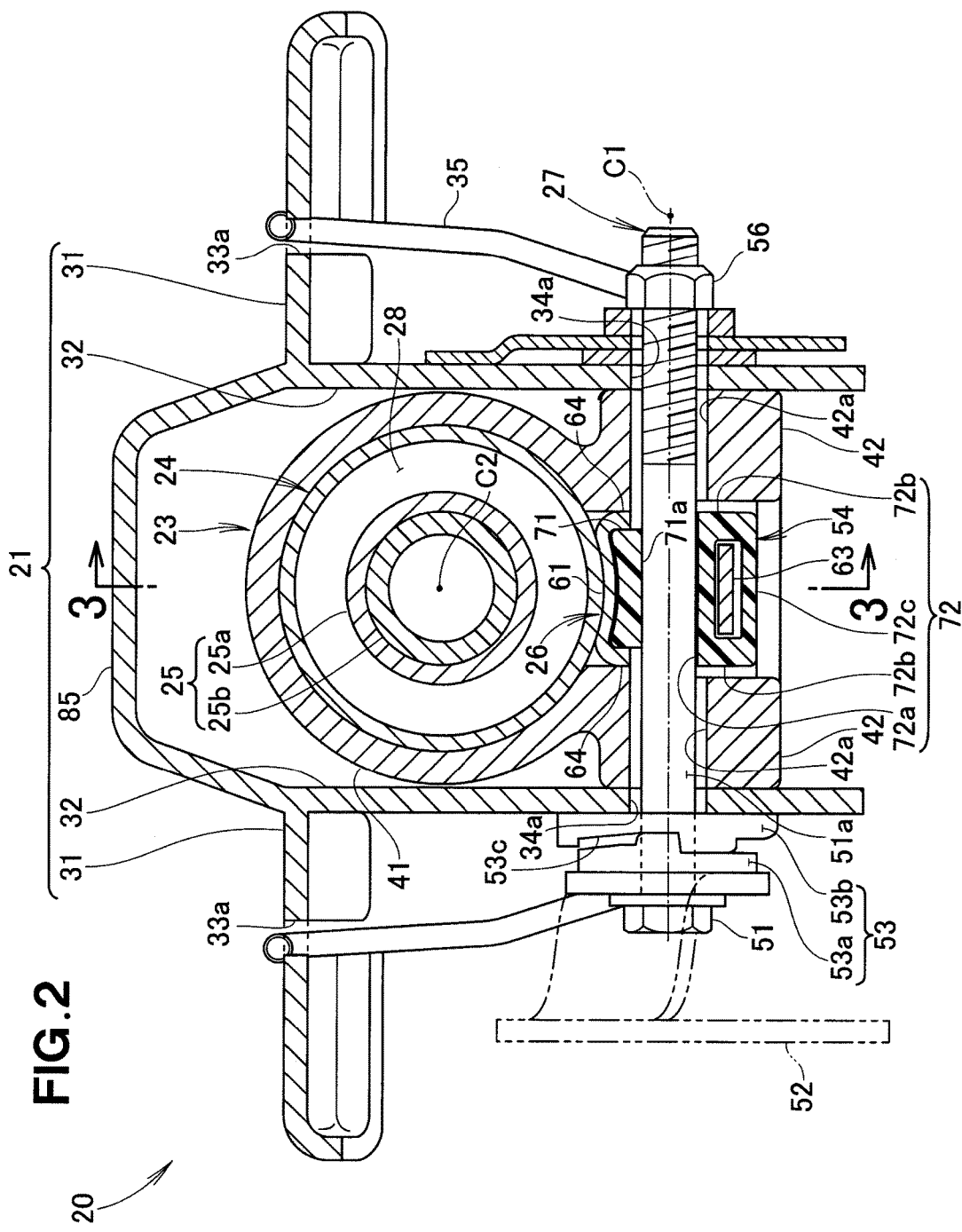
FIG. 2 is a sectional view taken along line 2-2 of FIG. 1.

FIG. 2 is a sectional view taken along the 2-2 line of FIG. 1, which particularly shows the steering apparatus 20 where the inner pipe 24 is in an immovable state. The bracket 21 includes: left and right vehicle-body-mounted sections 31 fixed to the vehicle body 11 (FIG. 1); left and right outer column support sections 32 formed integrally with respective (i.e., left and right) lower end portions of the vehicle-body-mounted sections 31 and sandwiching the outer column 23; and a top section 85. The left and right vehicle-body-mounted sections 31 are integrally interconnected via the top section 85.

The vehicle-body-mounted sections 31 each have a through-hole 33a formed therein for passage therethrough of one end portion of a spring 35. Namely, the vehicle-body-mounted sections 31 each function as a spring seat.

Further, the outer column support sections 32 each have a tilt adjusting elongated hole 34a formed therein. In the state shown in FIG. 2, the left and right outer column support sections 32 are opposed substantially parallel to each other.

The outer column 23 includes a pipe retaining section 41 opening downward as viewed in section taken along a vehicle width direction, and a pair of opposed leg sections 42 extending downward from respective lower end portions of the pipe retaining section 41. The pipe retaining section 41 is disposed along the outer periphery of the inner pipe 24.

The leg sections 42 each have a bolt insertion hole 42a formed generally horizontally therethrough. In the state shown in FIG. 2, the respective outer side surfaces of the leg sections 42 are held in contact with the respective inner surfaces of the outer column support sections 32 and pressed toward each other by the outer column support sections 32.

In the fastening mechanism 27, an operating lever 52, a cam section 53, a guide member 54 and a nut 56 are mounted on a bolt 51 passed through the elongated holes 34a and bolt insertion holes 42a of the leg sections 42. The operating lever 52 is fixed to a shaft section 51a of the bolt 51 for rotating the bolt 51.

The cam section 53 is a member that displaces or moves the bolt 51 and the operating lever 52 along the axis line C1 of the bolt 51 as the cam section 53 is rotated. The cam section 53 comprises a movable cam 53a fixed to the shaft section 51a of the bolt 51 and rotatable with the bolt 51, and an immovable fixed cam 53b fixed to an outer side surface portion of the left outer column 23.

The guide member 54 is a resin-made member disposed between the pair of leg sections 42, detail of which will be described later.

Figure 3:
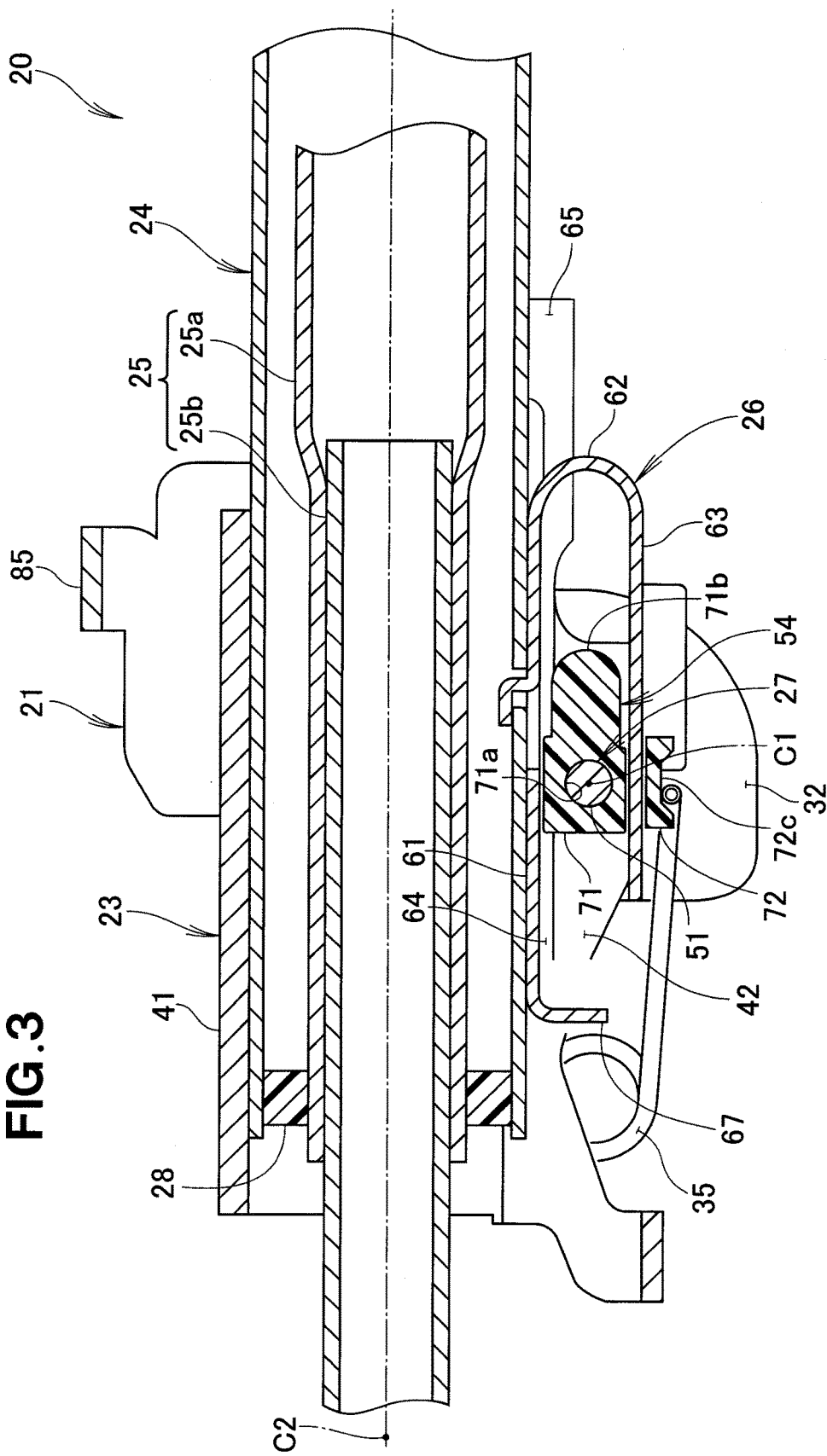
FIG. 3 is a sectional view taken along line 3-3 of FIG. 2.

FIG. 3 is a sectional view taken along the 3-3 line of FIG. 2. As shown, the steering shaft 25 includes an upper shaft section 25a supported by the inner pipe 24 via a bearing 28, and a lower shaft section 25b spline-fitted in the upper shaft section 25a.

Figure 4:
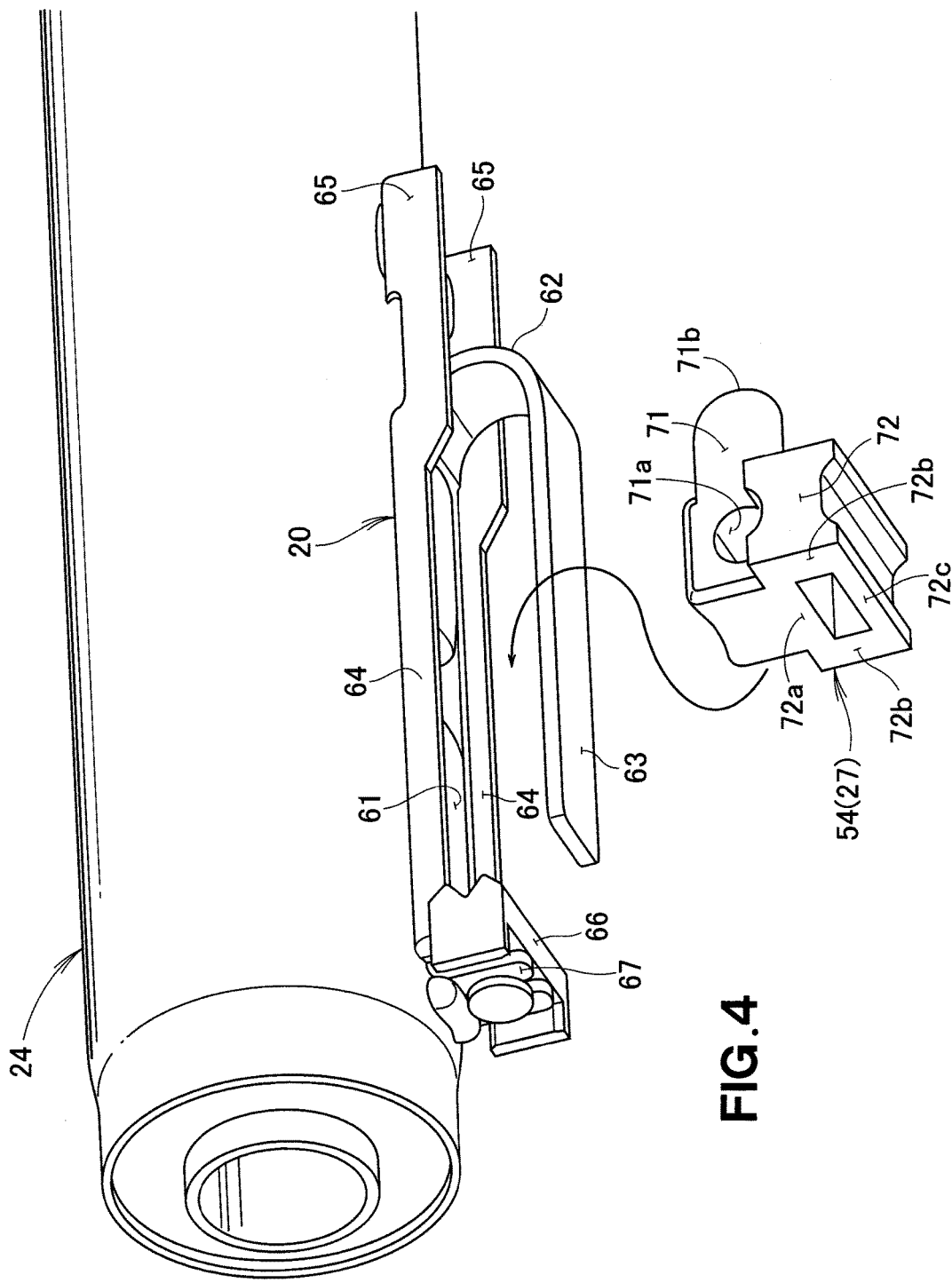
FIG. 4 is an exploded perspective view illustrating an inner pipe, an impact energy absorbing member and a guide member shown in FIG. 2.

Further, FIG. 4 is an exploded perspective view of the inner pipe 24, the impact energy absorbing member 26 and the guide member 54 shown in FIG. 2. As shown, the impact energy absorbing member 26, which is in the form of a single metal plate, includes: a base section 61 mounted to the lower surface of the inner pipe 24; an abuttable section 62 bent downward from the rear end of the base section 61 and abuttable against the guide member 54; an energy absorbing section 63 bent back forward from an end of the abuttable section 62 and capable of absorbing impact energy while deforming; flange sections 64 extending downward from a pair of side portions of the base section 61; extension sections 65 extending from the rear ends of the flange sections 64 rearward beyond the abuttable section 62; and a front stopper section 67 bent downward from the front end of the base section 61. Note that a rubber-made shock absorbing member 66 may be provided on the front stopper section 67 for minimizing sound generated by the front stopper section 67 contacting the guide member 54.

Referring to FIG. 3, the abuttable section 62 has a generally U shape opening forward as viewed in side elevation. In the abuttable section 62, the base section 61 and the energy absorbing section 63 extend straight in parallel to each other. It can also be said that the impact energy absorbing member 26 has a generally U shape as viewed in longitudinal section taken along the axis line C2 of the inner pipe 24.

Further, as shown in FIGS. 2 and 4, the guide member 54 includes an upper guide section 71 having a generally D shape as viewed in side elevation, and a lower guide section 72 of a rectangular parallelepiped shape formed integrally with a lower portion of the upper guide section 71.

The upper guide section 71 has a hole 71a having generally the same diameter as the shaft section 51a of the bolt 51, and a rear end portion (distal end portion) 71b of the upper guide section 71 is formed in a generally semicircular contour shape as viewed in side elevation. The rear end portion 71b of the upper guide section 71 has generally the same radius of curvature as the abuttable section 62.

The lower guide section 72 includes: an upper side portion 72a extending in the vehicle width direction along the upper surface of the energy absorbing section 63; guide member leg portions 72b extending downward from opposite sides of the upper side portion 72a along opposite sides of the energy absorbing section 63; and a guide member bottom portion 72c extending in the vehicle width direction along the lower surface of the energy absorbing section 63 in such a manner as to interconnect the lower ends of the leg portions 72b.

The spring 35 abuts against the guide member 54 to normally resiliently bias or urge the guide member 54 upward. Namely, the guide member 54 is normally resiliently pressed by the spring 35 against the impact energy absorbing member 26. Thus, the inner pipe 24 is normally resiliently pressed upward via the impact energy absorbing member 26, so that, even when the fastening by the fastening mechanism 27 has been canceled at the time of telescopic position adjustment, the inner pipe 24 can be retained at an appropriate position and thus the steering wheel can be moved in the front-rear direction in a more stable state.

Further, with the spring 35 normally resiliently pressing the guide member 54 and the inner pipe 24 upward, the lower end surface of the hole 71a of the guide member 54 is normally resiliently pressed against the bolt 51 passed through the leg sections 42 of the outer column 23. In this way, looseness or rattling between the bolt 51 and the guide member 54 can be avoided reliably.

The upper surfaces of the base section 61 and the upper guide section 71 are each formed in an arcuate shape concentric with a cross-sectional shape, taken in a direction perpendicular to the axis line C2, of the inner pipe 24, i.e. along the outer circumferential surface of the inner pipe 24.

Figure 5:
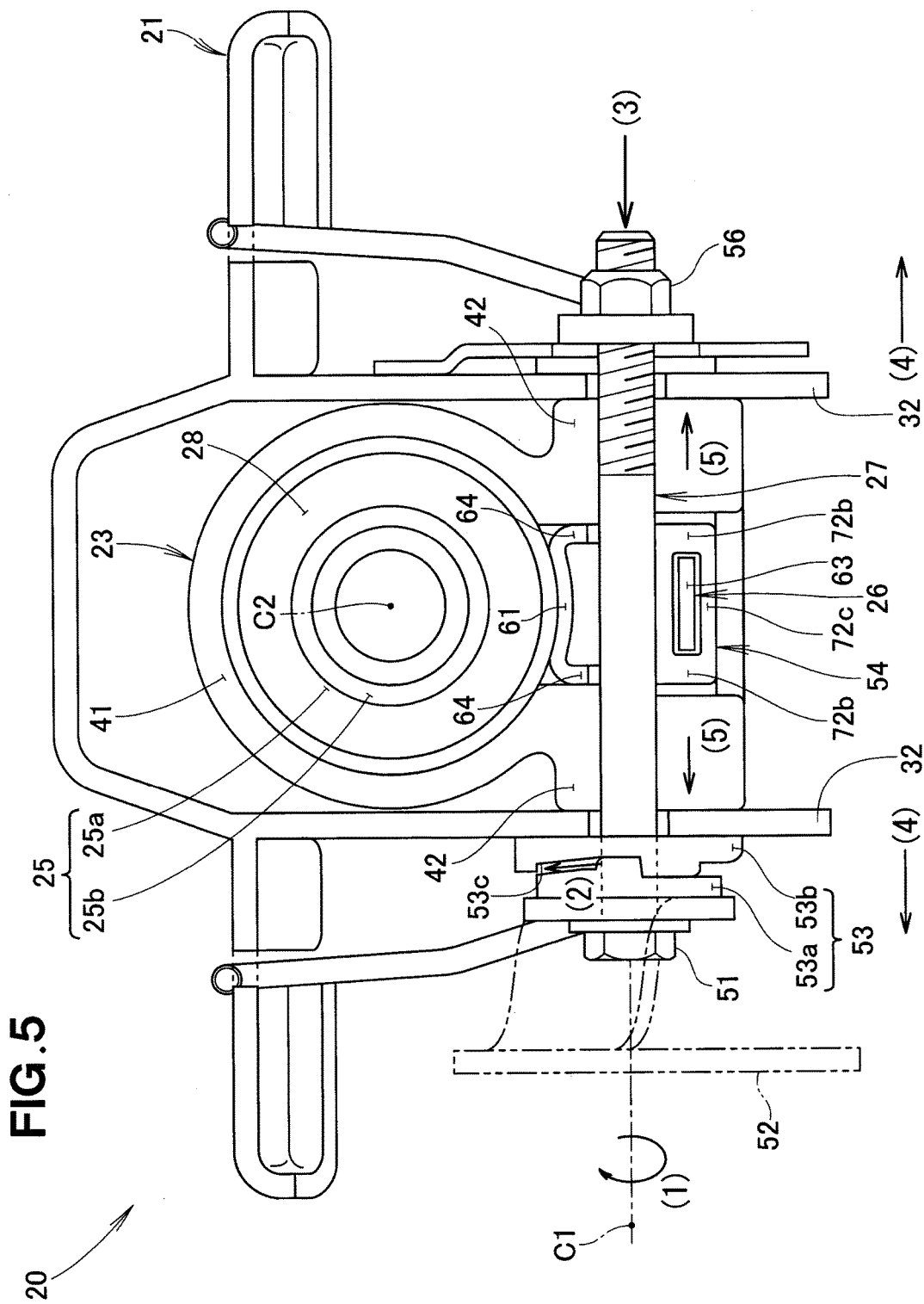
FIG. 5 is a view explanatory of how the steering apparatus shown in FIG. 2 is operated.

The following describe how the steering apparatus 20 is operated, with primary reference to FIG. 5. When the steering wheel is to be adjusted in position, the operating lever 52 is first rotated, so that the bolt 51 is rotated as indicated by arrow (1) in FIG. 5. In response to the rotation of the bolt 51, the movable cam 53a moves over a guide surface 53c as indicated by arrow (2). At the same time, the bolt 51 moves in such a direction that it's fastening force decreases as indicated by arrow (3). As the fastening force decreases like this, the outer column support sections 32 and the leg sections 42 move laterally outward as indicated by arrows (4) and (5). Thus, the force retaining the inner pipe 24 decreases, so that the inner pipe 24 is made movable in the front-rear direction (i.e., in a direction normal to the sheet of the figure).

Figure 6:
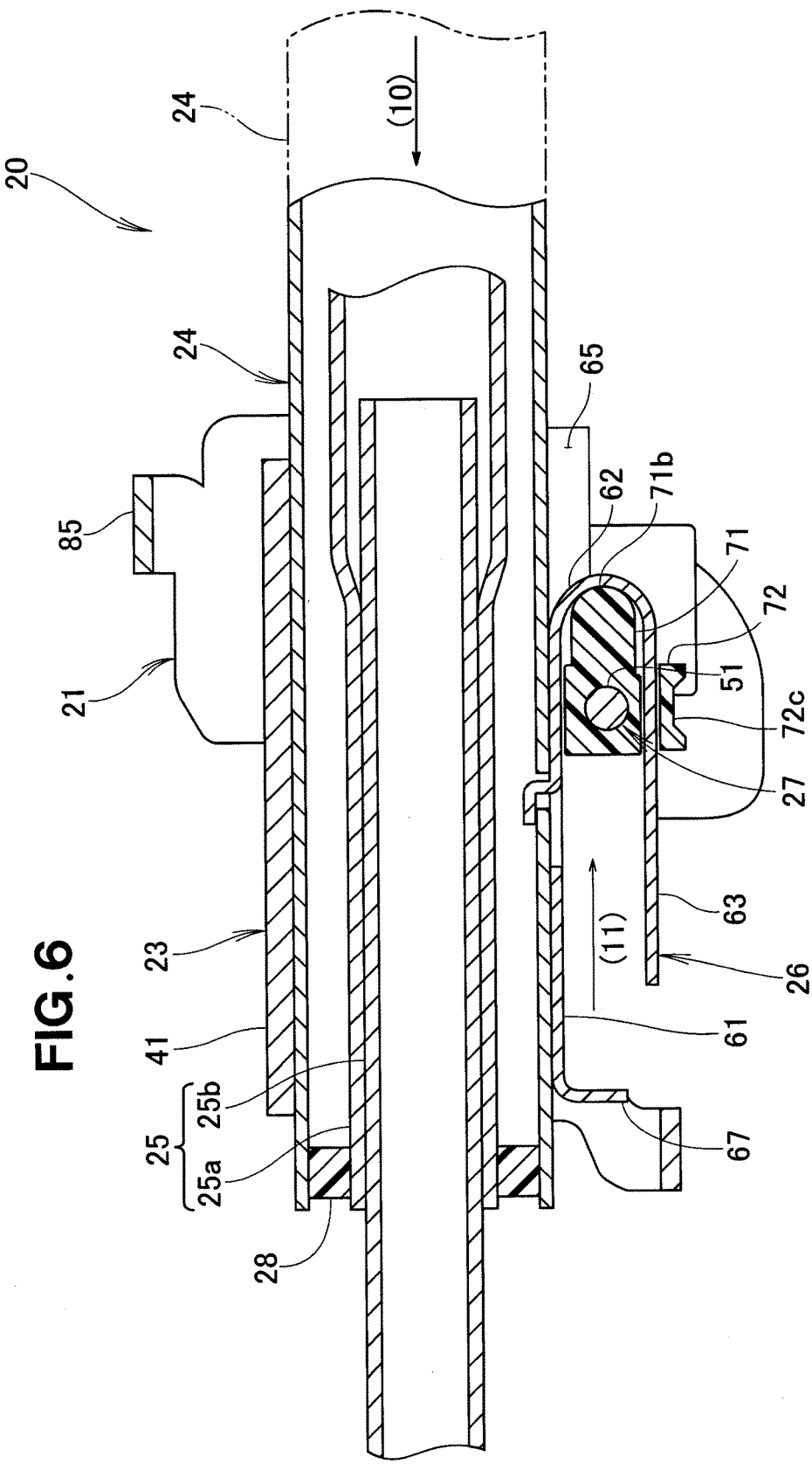
FIG. 6 is a view explanatory of operation of the steering apparatus in normal conditions.

FIG. 6 shows the steering device 20 with the inner pipe 24 made movable in the front-rear direction (i.e., in the movable state) as above. In this state, the inner pipe 24 is movable in the front-rear direction as indicated by arrows (10) and (11). As the inner pipe 24 moves in the front-rear direction, the bearing 28 and the upper shaft section 25a move in the front-rear direction. Thus, the position of the steering wheel mounted to the rear end portion of the upper shaft section 25a can be adjusted. During that time, the bracket 21, the outer column 23, the lower shaft section 25b and the fastening mechanism 27 do not move.

Forward movement of the inner pipe 24 is restricted by the abuttable section 62 contacting the rear end portion (distal end portion) 71b of the upper guide section 71. Namely, the distal end portion 71b of the upper guide section 71 can be said to be a stopper for defining a forward movement limit of the inner pipe 24 when the inner pipe 24 is in the movable state.

Rearward movement of the inner pipe 24, on the other hand, is restricted by the front stopper section 67 contacting the front end of the upper guide section 71. While the front stopper section 67 is in contact with the front end of the upper guide section 71, the front end of the energy absorbing section 63 is located above the lower guide section 72. Namely, the energy absorbing section 63 has a length in the front-rear direction such that, when the inner pipe 24 has been moved rearward to a rearward movement limit, a portion of the energy absorbing section 63 overlaps the guide member 54 in the front-rear direction.

Once the driver finishes adjusting the position of the steering wheel, he or she again rotates the operating lever 52 (FIG. 1) to return the inner pipe 24 back to the immovable state.

The following describe operation of the steering apparatus 20 when a load has been input. FIG. 7(a) shows the steering apparatus 20 with the inner pipe 24 in the immovable state. When the vehicle collides against an obstacle outside the vehicle, the driver's upper body may be move or displaced forward. If the driver's upper body having been moved forward as above contacts the steering wheel, a forward load as indicated by a white arrow is input to the inner pipe 24 via the upper shaft section 25a (FIG. 3).

If the input load is large, the inner pipe 24 moves forward against the retaining force of the outer column 23 (FIG. 3), in response to which the impact energy absorbing member 26 too moves forward. However, the fastening mechanism 27 does not move at that time.

As the inner pipe 24 moves forward as above, the abuttable section 62 contacts the rear or distal end portion 71b of the upper guide section 71. As the inner pipe 24 further moves forward due to the input load, the impact energy absorbing member 26 too moves forward while causing the energy absorbing section 63 to deform plastically as shown in FIG. 7(c) as if falling rearward, so that the energy absorbing section 63 can absorb energy of the impact load input via the upper shaft section 25a.

The embodiment of the power steering apparatus of the present invention constructed in the aforementioned manner can achieve the following advantageous benefits.

Figure 7:
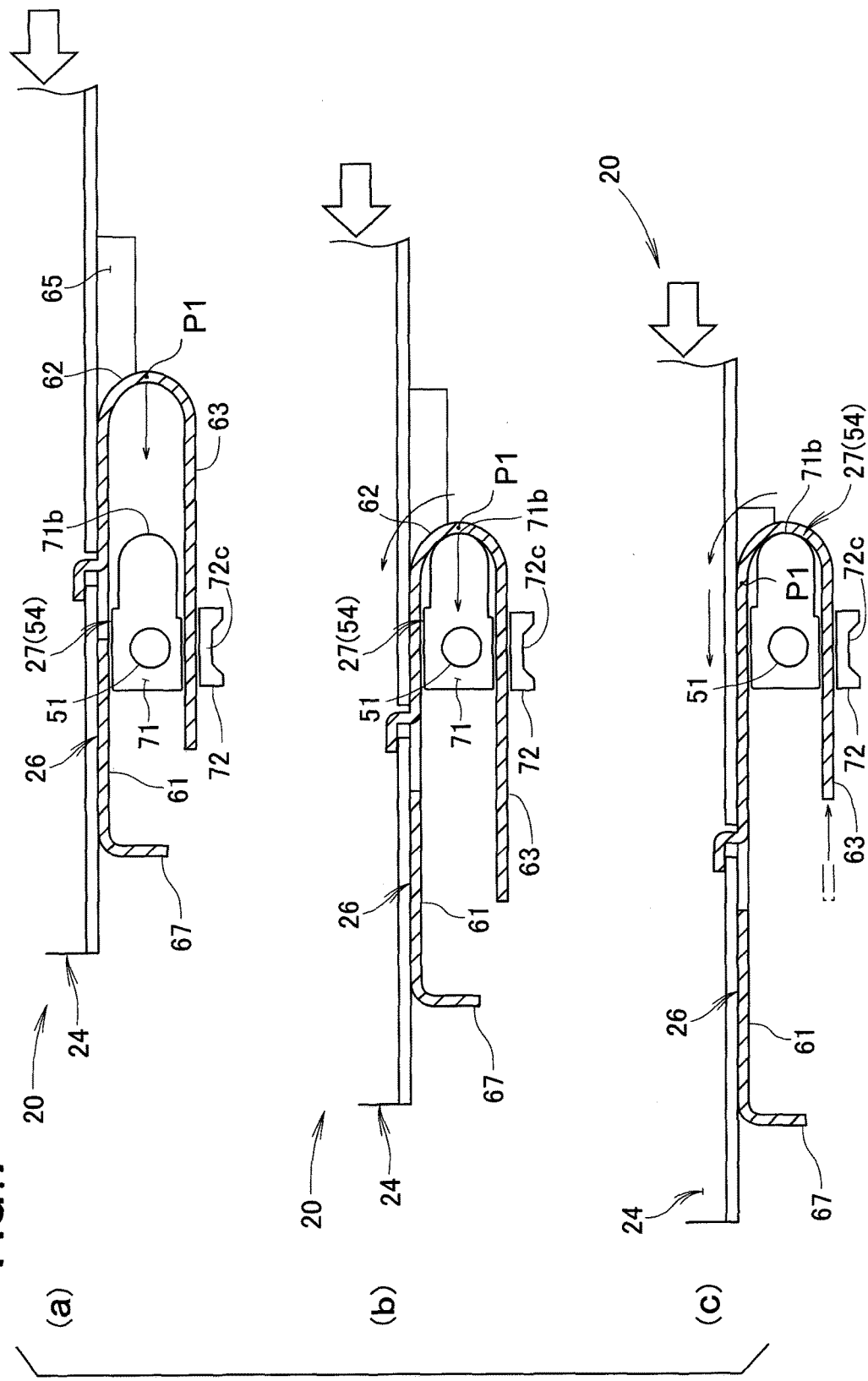
FIG. 7 is a view explanatory of operation of the steering apparatus when an impact has been input to the steering apparatus.
Figure 8:
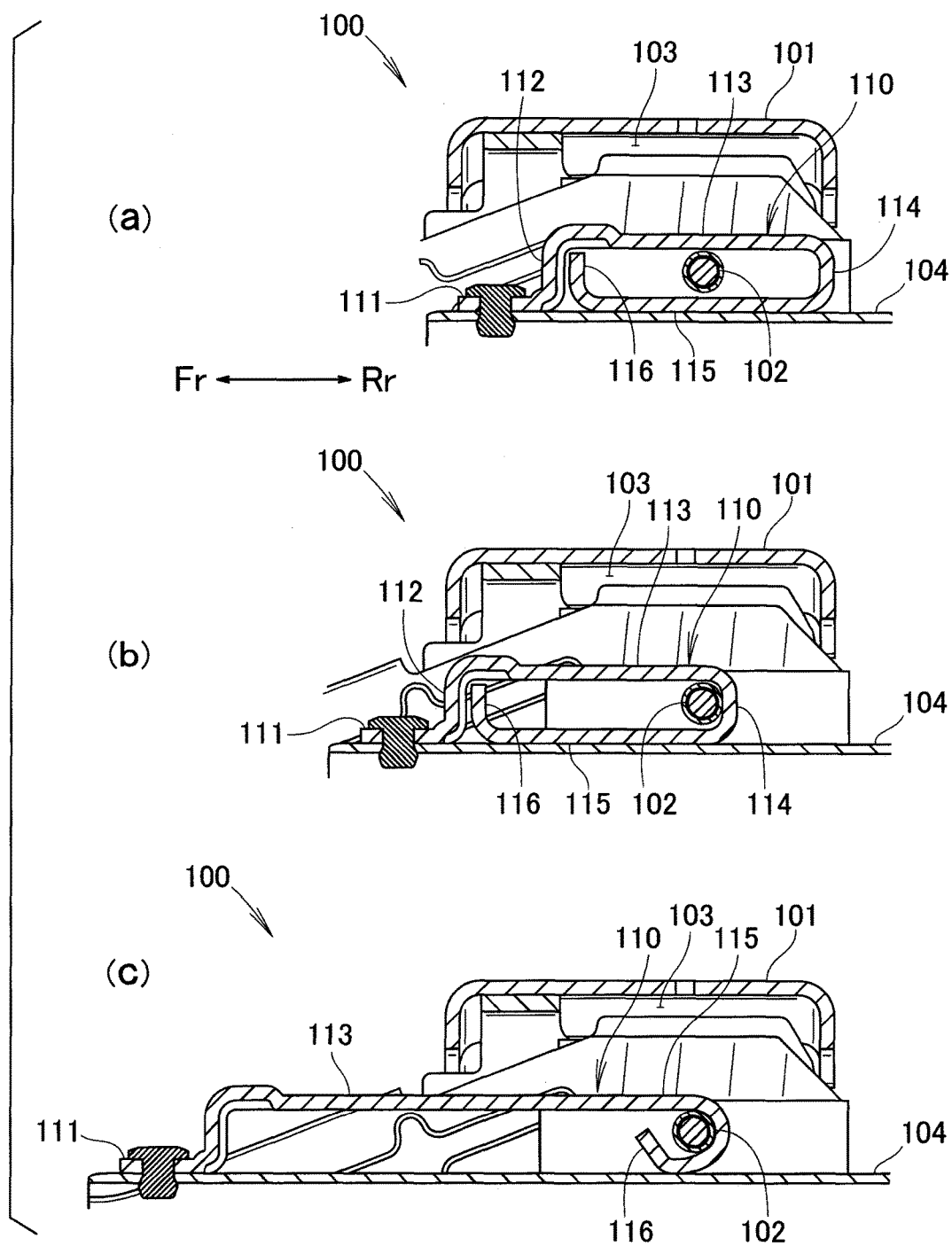
FIG. 8 is a view explanatory of a conventionally-known technique relevant to the present invention.

As shown in FIG. 7, the impact energy absorbing member 26 having a generally U sectional shape includes: the base section 61 mounted to the inner pipe 24; the abuttable section 62 bend from the rear end of the base section 61 and abuttable against the guide member 54 that is a part of the fastening mechanism 27; and the energy absorbing section 63 bent back forward from the end of the abuttable section 62. The energy absorbing section 63 does not contact the inner pipe 24. Thus, the instant embodiment of the invention can reduce a total area of portions of the energy absorbing section 63 that can contact other component parts and thereby minimize influences of friction and stabilize impact-energy-absorbing characteristics per product.

In addition, the instant embodiment allows energy absorbing settings to be made for various possible loads by merely changing the plate thickness and width of the impact energy absorbing member 26 and the radii of curvature of the abuttable section 62 and the distal end portion 71b, without taking into account the friction of the energy absorbing section 63 with the inner pipe 24.

Further, a rear end portion of the abuttable section 62 and the rear (distal) end portion 71b of the upper guide section 71 of the guide member 54 against which the rear end portion of the abuttable section 62 abuts has an arcuate shape in section taken along the axis line of the inner pipe 24. In addition, the rear (distal) end portion 71b of the upper guide section 71 has generally the same radius of curvature as the rear end portion of the abuttable section 62. Thus, the abuttable section 62 is allowed to reliably contact the guide member 54 as viewed in section taken along the axis line of the inner pipe 24. In this manner, the instant embodiment can reliably absorb impact energy.

Further, the guide member 54 through which the bolt 51 is passed includes the leg portions 72b extending along the opposite sides of the energy absorbing section 63, as shown in FIG. 2. Thus, during deformation of the energy absorbing section 63, the leg portions 72b function as a guide to restrict movement of the energy absorbing section 63 along the axial direction of the bolt 51, so that the energy absorbing section 63 can reliably absorb impact energy.

Further, the guide member 54 includes the bottom portion 72c extending along the lower surface of the energy absorbing section 63 in such a manner as to interconnect the lower ends of the leg portions 72b. When the energy absorbing section 63 deforms in a direction perpendicular to the axis line of the bolt 51 (in the downward direction in the figure), it contacts the bottom portion 72c of the guide member 54, so that displacement, in the direction perpendicular to the axis line of the bolt 51, of the energy absorbing section 63 can be restricted. In this way, the energy absorbing section 63 can reliably absorb impact energy.

Further, the guide member 54 in the instant embodiment has (or implements) a function for causing deformation of the impact energy absorbing member 26, a function of preventing the impact energy absorbing member 26 from being displaced downward, and a function as a shock absorber at the time of telescopic position adjustment. Namely, the above-mentioned three functions are performed by the single member 54, and thus, the instant embodiment can reduce the necessary number of component parts and necessary cost.

Further, the flange sections 64 for restricting axial movement of the bolt 51 extend from the opposite sides of the base section 61 along the opposite sides of the guide member 54. The extension sections 65 extend from the rear ends of the flange sections 64 rearward beyond the abuttable section 62, as shown in FIG. 3. Such extension sections 65 function as a guide, at the time of deformation of the energy absorbing section 63 along the axial direction of the bolt 51, such that displacement, along the axis of the bolt 51, of the energy absorbing section 63 can be restricted, and that the energy absorbing section 63 can deform along the axial direction of the inner pipe 24 and thereby reliably absorb impact energy.

The energy absorbing section 63 has such a length in the front-rear direction that, when the inner pipe 24 has been moved rearward to the rearward movement limit, a portion of the energy absorbing section 63 overlaps the guide member 54 in the front-rear direction, as shown in FIG. 6. Thus, the energy absorbing section 63 can deform along the axis line of the inner pipe 24 up to near the front end of the section 63 without getting off the guide member 54.

It should be appreciated that the present invention is not limited to the above-described embodiment as long as the operation and advantageous benefits of the invention as described above can be achieved.

Finally, the basic principles of the present invention are suited for application to steering apparatus of passenger vehicles.

What is claimed is:

1. A steering apparatus for a vehicle including an outer column supported by a bracket, and an inner pipe retained by the outer column for movement in a front-rear direction of the vehicle, the outer column including a pipe retaining section retaining an outer periphery of the inner pipe, and a pair of opposed leg sections extending from opposite end portions of the pipe retaining section and interconnected via a fastening mechanism, the movement, in the front-rear direction, of the inner pipe being restricted by fastening force of the fastening mechanism, which comprises:

a metal-made impact energy absorbing member provided on the inner pipe and having a generally U shape as viewed in section along an axis line of the inner pipe, the impact energy absorbing member including: a base section mounted to the inner pipe; an abuttable section bent from a rear end of the base section in such a manner that the abuttable section is abuttable against the fastening mechanism; and an energy absorbing section bent back forward from an end of the abuttable section in such a manner that, when an impact is input to the inner pipe, the energy absorbing section absorbs energy of the impact while deforming by abutting against the fastening mechanism, wherein the fastening mechanism includes: a bolt passed through the pair of opposed leg sections; a nut screwed to the bolt; and a guide member mounted on a shaft section of the bolt and located between the pair of opposed leg sections, and wherein the guide member includes: guide member leg portions extending along opposite sides of the energy absorbing section; and a guide member bottom portion extending along the energy absorbing section in such a manner as to interconnect respective ends of the guide member leg portions.

2. The steering apparatus according to claim 1, wherein the impact energy absorbing member includes: flange sections extending from respective ones of a pair of side portions of the base section along opposite sides of the guide member; and extension sections extending from rear ends of respective ones of the flange sections rearward beyond the abuttable section.

3. A steering apparatus for a vehicle including an outer column supported by a bracket, and an inner pipe retained by the outer column for movement in a front-rear direction of the vehicle, the outer column including a pipe retaining section retaining an outer periphery of the inner pipe, and a pair of opposed leg sections extending from opposite end portions of the pipe retaining section and interconnected via a fastening mechanism, the movement, in the front-rear direction, of the inner pipe being restricted by fastening force of the fastening mechanism, which comprises:

a metal-made impact energy absorbing member provided on the inner pipe and having a generally U shape as viewed in section along an axis line of the inner pipe, the impact energy absorbing member including: a base section mounted to the inner pipe; an abuttable section bent from a rear end of the base section in such a manner that the abuttable section is abuttable against the fastening mechanism; and an energy absorbing section bent back forward from an end of the abuttable section in such a manner that, when an impact is input to the inner pipe, the energy absorbing section absorbs energy of the impact while deforming by abutting against the fastening mechanism, wherein the impact energy absorbing member includes: flange sections extending from respective ones of a pair of side portions of the base section along opposite sides of a guide member; and extension sections extending from rear ends of respective ones of the flange sections rearward beyond the abuttable section.

* * * * *